United States Patent
Chen et al.

(10) Patent No.: US 11,882,536 B2
(45) Date of Patent: **\*Jan. 23, 2024**

(54) SYSTEM AND METHOD FOR TRANSMITTING A SIGNAL

(71) Applicant: ZTE CORPORATION, Guangdong (CN)

(72) Inventors: Xianming Chen, Guangdong (CN); Bo Dai, Guangdong (CN); Kun Liu, Guangdong (CN); Weiwei Yang, Guangdong (CN); Huiying Fang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 71 days.

This patent is subject to a terminal disclaimer.

(21) Appl. No.: 17/531,668

(22) Filed: Nov. 19, 2021

(65) Prior Publication Data

US 2022/0182276 A1 Jun. 9, 2022

Related U.S. Application Data

(63) Continuation of application No. 16/727,803, filed on Dec. 26, 2019, now Pat. No. 11,201,776, which is a
(Continued)

(51) Int. Cl.
*H04L 5/00* (2006.01)
*H04W 48/12* (2009.01)
(Continued)

(52) U.S. Cl.
CPC ..... *H04W 56/0015* (2013.01); *H04J 11/0069* (2013.01); *H04L 5/0048* (2013.01);
(Continued)

(58) Field of Classification Search
None
See application file for complete search history.

(56) References Cited

U.S. PATENT DOCUMENTS 10,772,089 B2  9/2020 Xiao et al.
2014/0140314 A1  5/2014 Wei et al.
(Continued)

FOREIGN PATENT DOCUMENTS

CN  102119567 A  7/2011
CN  102356612 A  2/2012
(Continued)

OTHER PUBLICATIONS

Huawei et al., "Frequency location of the synchronization signals" 3GPP TSG RAN WG1 Meeting #88, R1-1701712, Feb. 17, 2017 (Feb. 17, 2017), Sections 2-3, 9 pages.
(Continued)

*Primary Examiner* — Ajit Patel
(74) *Attorney, Agent, or Firm* — Duane Morris LLP

(57) ABSTRACT

A system and method for transmitting a signal are disclosed herein. In one embodiment, the system and method are configured to perform: transmitting one or more synchronization signals using an anchor carrier with a first frequency location; and transmitting a system information block using a non-anchor carrier with a second frequency location that is different from the first frequency location.

20 Claims, 12 Drawing Sheets

Related U.S. Application Data continuation of application No. PCT/CN2017/092805, filed on Jul. 13, 2017.

(51) Int. Cl.
  *H04W 56/00* (2009.01)
  *H04J 11/00* (2006.01)
  *H04L 27/26* (2006.01)
  *H04W 72/0453* (2023.01)

(52) U.S. Cl.
  CPC ...... *H04L 27/2613* (2013.01); *H04L 27/2657* (2013.01); *H04L 27/2675* (2013.01); *H04W 72/0453* (2013.01); *H04L 5/0007* (2013.01)

(56) References Cited

U.S. PATENT DOCUMENTS

| | | | |
|---|---|---|---|
| 2016/0112965 A1 | 4/2016 | Damnjanovic | |
| 2016/0205692 A1 | 7/2016 | Zhang | |
| 2017/0180095 A1* | 6/2017 | Xue | H04L 27/2601 |
| 2017/0238292 A1* | 8/2017 | Rico Alvarino | H04W 48/00 |
| | | | 370/329 |
| 2017/0265171 A1* | 9/2017 | Rico Alvarino | H04L 5/0048 |
| 2017/0289965 A1* | 10/2017 | You | H04W 52/02 |
| 2018/0069589 A1* | 3/2018 | Liu | H04L 5/0064 |
| 2018/0270008 A1 | 9/2018 | Yi et al. | |
| 2018/0287845 A1 | 10/2018 | Kim et al. | |
| 2019/0319764 A1 | 10/2019 | Nader et al. | |

FOREIGN PATENT DOCUMENTS

| | | | | |
|---|---|---|---|---|
| CN | 102845122 A | 12/2012 | | |
| CN | 102907152 A | 1/2013 | | |
| CN | 106797552 A | 5/2017 | | |
| CN | 106856670 A | 6/2017 | | |
| EP | 2481249 A1 | 8/2012 | | |
| EP | 3367602 B1 * | 12/2020 | | H04J 11/0073 |
| WO | 2011035420 A1 | 3/2011 | | |
| WO | 2017007556 A1 | 1/2017 | | |
| WO | 2017069474 A1 | 4/2017 | | |

OTHER PUBLICATIONS

Lenovo, "Discussion on NB-IoT multi-carrier operation" 3GPP, TSG RAN WG1 Meeting #84, R1-161008, Feb. 19, 2016, 4 pages.

Zte et al., "Discussion on system acquisition time reduction for NB-Iot", 3GPP TSG RAN WG1 Meeting #88ibs, R1-1705488, Apr. 2, 2017, 3 pages.

\* cited by examiner

SYSTEM AND METHOD FOR TRANSMITTING A SIGNAL

CROSS-REFERENCE TO RELATED APPLICATION

The present application is a continuation application of U.S. application Ser. No. 16/727,803 entitled "SYSTEM AND METHOD FOR TRANSMITTING A SIGNAL," filed on Dec. 26, 2019, which is a continuation of PCT international application PCT/CN2017/092805, entitled "SYSTEM AND METHOD FOR TRANSMITTING A SIGNAL," filed on Jul. 13, 2017, which is expressly incorporated by reference herein in its entirety.

TECHNICAL FIELD

The disclosure relates generally to wireless communications and, more particularly, to systems and methods to transmit a signal.

BACKGROUND

In accordance with rapid developments and increasing needs of the Internet of Things (IoT), a new radio interface, a Narrowband Internet of Things (NB-IoT), has been proposed by the 3$^{rd}$ Generation Partnership Project (3GPP). The NB-IoT is aimed to enhance existing Global System for Mobile Communications (GSM) and Long-Term Evolution (LTE) networks to better serve IoT uses or applications. Improved indoor coverage, support for massive number of low throughput end devices, low delay sensitivity, ultra-low device cost, coverage extension, battery lifetime extension, and backward compatibility are some exemplary objectives of the NB-IoT.

Generally, in a wireless communication system adopting the NB-IoT (hereinafter "NB-IoT system"), a user equipment device (UE) camps in a cell of a base station (BS) by performing a cell acquisition process. Such a cell acquisition process is typically performed when the UE is first switched on. Subsequently, the UE synchronizes with the cell, and then retrieves various significant configuration information (e.g., a downlink bandwidth, system frame number, etc.) of the cell to finish the acquisition process. In existing NB-IoT systems, the UE synchronizes with the cell by receiving primary and secondary synchronization signals, and retrieves the various significant configuration information by reading a received Master Information Block (MIB) and at least a received initial System Information Block (SIB1).

More particularly, in existing NB-IoT systems, the primary and secondary synchronization signal (collectively referred to as "synchronization signals"), and the MIB and SIB1 (collectively referred to as "public signals") are all required to be transmitted (e.g., modulated) on a single carrier, typically known as an "anchor carrier," from the BS to the UE. Such a requirement of using a single carrier may encounter various issues such as, for example, a substantially reduced amount of available resources (e.g., a number of frames) on the anchor carrier, delayed reception of downlink control information and/or data when transmitted on the anchor carrier, etc. Thus, existing methods in the NB-IoT system to transmit the synchronization signals and public signals are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method includes: transmitting one or more synchronization signals using an anchor carrier with a first frequency location; and transmitting a system information block using a non-anchor carrier with a second frequency location that is different from the first frequency location.

In a further embodiment, a method includes: receiving one or more synchronization signals modulated on an anchor carrier with a first frequency location; and receiving a system information block modulated on a non-anchor carrier with a second frequency location that is different from the first frequency location.

In another embodiment, a communication node includes: a transmitter configured to: transmit one or more synchronization signals using an anchor carrier with a first frequency location; and transmit a system information block using a non-anchor carrier with a second frequency location that is different from the first frequency location.

In yet another embodiment, a communication node, includes: a receiver configured to: receive one or more synchronization signals modulated on an anchor carrier with a first frequency location; receive a system information block modulated on a non-anchor carrier with a second frequency location that is different from the first frequency location.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Figure 1:
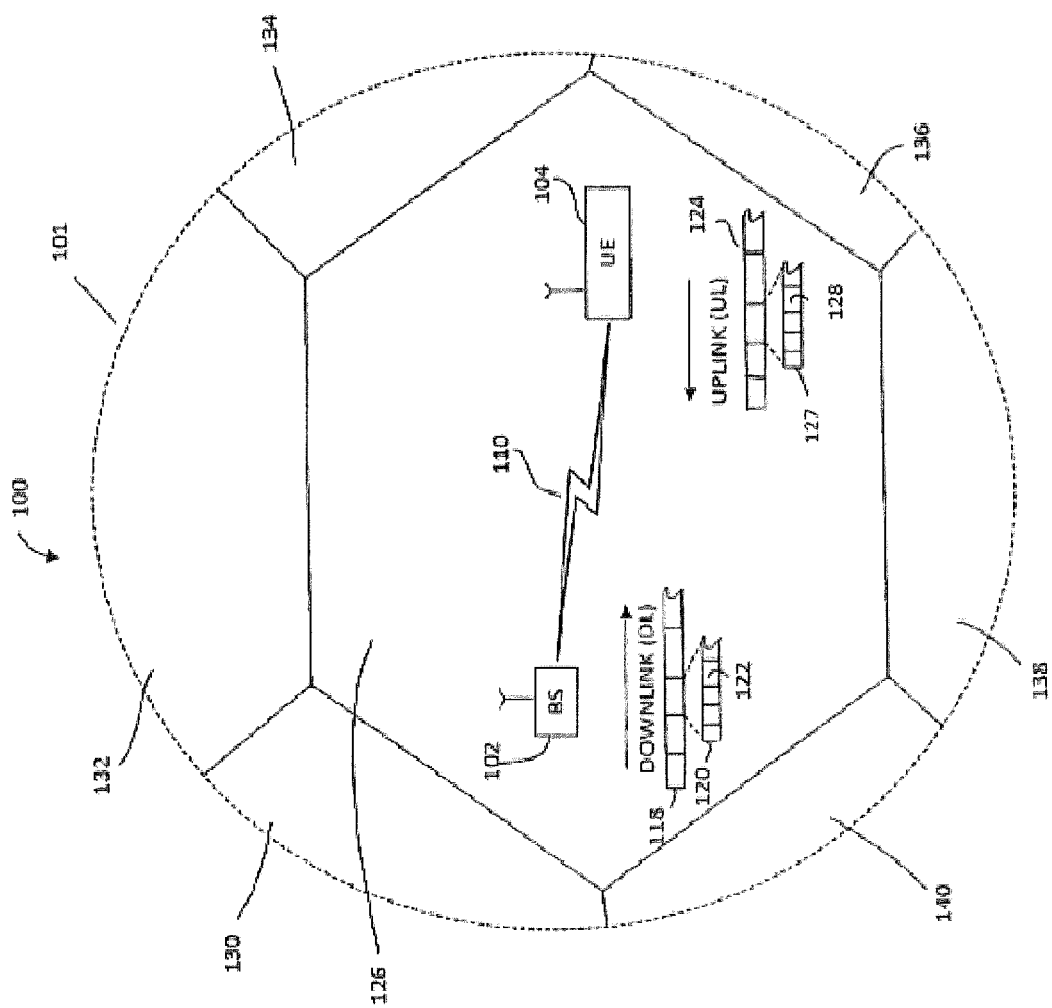
FIG. 1 illustrates an exemplary cellular communication network in which techniques disclosed herein may be implemented, in accordance with an embodiment of the present disclosure.

FIG. 1 illustrates an exemplary wireless communication network 100 in which techniques disclosed herein may be implemented, in accordance with an embodiment of the present disclosure. In the following discussion, the wireless communication network 100 may be a NB-IoT network, which is herein referred to as "network 100." Such an exemplary network 100 includes a base station 102 (hereinafter "BS 102") and a user equipment device 104 (hereinafter "UE 104") that can communicate with each other via a communication link 110 (e.g., a wireless communication channel), and a cluster of notional cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the invention.

Figure 2:
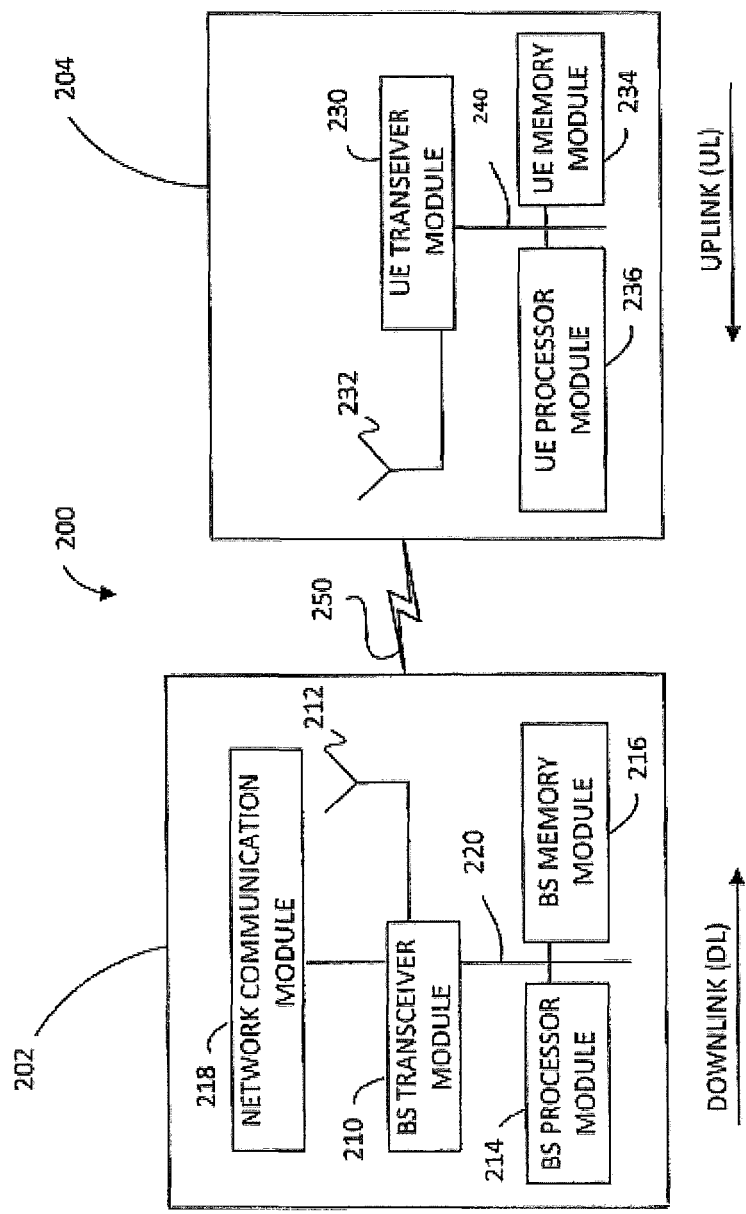
FIG. 2 illustrates block diagrams of an exemplary base station and a user equipment device, in accordance with some embodiments of the present disclosure.

FIG. 2 illustrates a block diagram of an exemplary wireless communication system 200 for transmitting and receiving wireless communication signals, e.g., OFDM/OFDMA signals, in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a date communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver 230 may be referred to herein as an "uplink" transceiver 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceivers 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some exemplary embodiments, the UE transceiver 210 and the base station transceiver 210 are configured to support industry standards such as the Long Term Evolution (LTE) and emerging 5G standards, and the like. It is understood, however, that the invention is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)).

Referring again to FIG. 1, when the UE 104 performs the cell acquisition process to camp in the cell 126 of the BS 102, the UE 104 receives respective synchronization signals and public signals for synchronization and configurations purposes, respectively. The existing NB-IoT system requires the synchronization signals and public signals to be transmitted on a single carrier, which causes various issues as described above.

The present disclosure provides various embodiments of systems and methods to transmit the synchronization signals and at least part of the public signals on respective different carriers, which are herein referred to as "anchor carrier" and "non-anchor carrier," respectively. In particular, when a carrier is used to transmit the synchronization signals, such a carrier is referred to as an anchor carrier; and when a carrier is not used to transmit the synchronization signals, such a carrier is referred to as a non-anchor carrier. In some embodiments, the anchor carrier and the non-anchor carrier share a same carrier bandwidth, but have respective different frequency locations, which may be pre-defined by a protocol of the network 100. In some other embodiments, the protocol may define the frequency location of the anchor carrier and, based on the frequency location of the anchor carrier, provide a plurality of options, each of which corresponds to a respective available frequency location for the non-anchor carrier. In some embodiments, a signal transmitted on the anchor carrier may indicate which of the plurality of options is the frequency location of the non-anchor carrier. Accordingly, upon receiving the indication contained in the signal transmitted on the anchor carrier, the UE 104 may follow the indication to retrieve various signals transmitted on the non-anchor carrier. By separating the synchronization signals and at least part of the public signals to be transmitted on respective different carriers, various advantages may be provided such as, for example, substantially reduced reception delay on the downlink control information and/or data when transmitted on the anchor carrier, substantially reduced power consumption to receive the downlink control information and/or data when transmitted on the anchor carrier, etc.

Figure 3A:
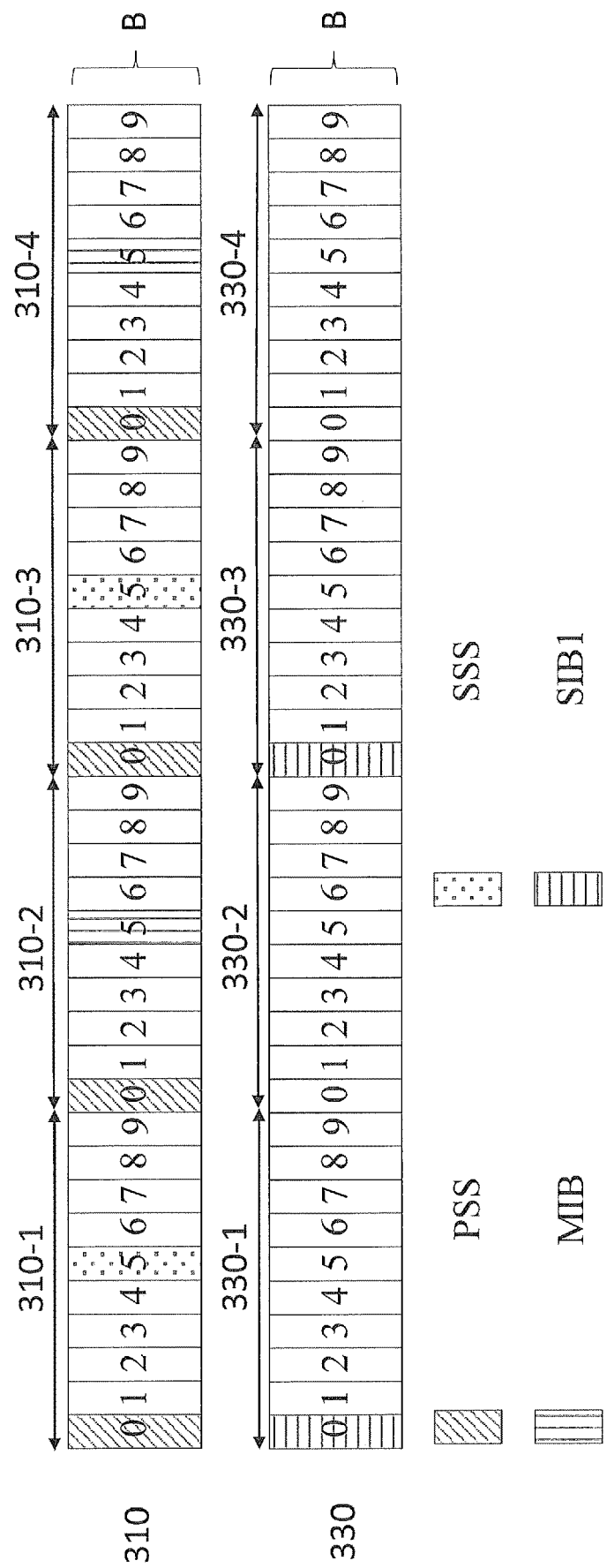
FIG. 3A illustrates exemplary frame structures of an anchor carrier and a non-anchor carrier, respectively, in accordance with some embodiments of the present disclosure.

FIG. 3A illustrates exemplary frame structures of an anchor carrier 310 and a non-anchor carrier 330, respectively, in accordance with some embodiments of the present disclosure. In some embodiments, when the anchor carrier 310 and the non-anchor carrier 330 are used in the NB-IoT system, the anchor carrier 310 and the non-anchor carrier 330 share a same carrier bandwidth "B" (e.g., 180 kHz) along a frequency domain. In some embodiments, the anchor carrier 310 and the non-anchor carrier 330 may occupy respective different frequency ranges. Alternatively stated, respective frequency locations of the anchor carrier 310 and the non-anchor carrier 330 may be spaced from each other by one or more carrier bandwidths B, which will be discussed in further detail below.

In the illustrated embodiment of FIG. 3A, the anchor carrier 310 includes frames 310-1, 310-2, 310-3, and 310-4 coupled from one to another along a time domain; and the non-anchor carrier 330 includes frames 330-1, 330-2, 330-3, and 330-4 coupled from one to another along the time domain. In some embodiments, each frame of the anchor carrier 310 correspond to a respective frame of the non-anchor carrier 330 along the time domain, that is, sharing a same time period. For example, the frame 310-1 shares a same time period with the frame 330-1; the frame 310-2 shares a same time period with the frame 330-2; the frame 310-3 shares a same time period with the frame 330-3; and the frame 310-4 shares a same time period with the frame 330-4. Although only four frames are illustrated in each of the anchor carrier 310 and the non-anchor carrier 330, it is understood that each of the anchor carrier 310 and the non-anchor carrier 330 may have any desired number of frames while remaining within the scope of the present disclosure. For example, the anchor carrier 310 may include plural sets, each of which consists of the frames 310-1, 310-2, 310-3, and 310-4; and the non-anchor carrier 330 may include plural set, each of which consists of the frames 330-1, 330-2, 330-3, and 330-4, wherein the respective sets of the anchor carrier 310 and the non-anchor carrier 330 are periodically repeated. In some embodiments, such a periodic repetition of respective frames within the anchor carrier and non-anchor carrier may be applicable for the examples provided in FIGS. 4, 5, 6, 7, 8, and 9, so that discussions of the periodic repetition of respective frames will not be repeated below.

In some embodiments, each of the respective frames of the anchor carrier 310 and the non-anchor carrier 330 includes 10 sub-frames, each of which is associated with a sub-frame index #, e.g., 0, 1, 2, 3, 4, 5, 6, 7, 8, or 9. Although not shown, it is understood by persons of ordinary skill in the art that each sub-frame of the anchor carrier 310 and the non-anchor carrier 330 has a plurality of symbols (e.g., 14 symbols), each of which may carry a sequence value or data. Further, in the illustrated embodiment of FIG. 3A, the synchronization signals, including the primary synchronization signal (PSS) and the secondary synchronization signal (SSS), and part of the public signals, including the Master Information Block (MIB), are transmitted on the anchor carrier 310; and part of the public signals, including the initial System Information Block (SIB1), are transmitted on the non-anchor carrier 330. In some embodiments, in the NB-IoT system, the PSS, the SSS, the MIB, and the SIB1 are also referred to as "narrowband PSS (NPSS)," "narrowband SSS (NSSS)," "MIB-narrowband (MIB-NB)," and "SIB1-narrowband (SIB1-NB)," respectively. For purpose of consistency, the terms "PSS," "SSS," "MIB," and "SIB1" are consistently used in the following discussions.

More specifically, in some embodiments, the PSS is transmitted on sub-frame #0 of the frame 310-1, sub-frame #0 of the frame 310-2, sub-frame #0 of the frame 310-3, and sub-frame #0 of the frame 310-4; the SSS is transmitted on sub-frame #5 of the frame 310-1, and sub-frame #5 of the frame 310-3; and the MIB is transmitted on sub-frame #5 of the frame 310-2, and sub-frame #5 of the frame 310-4. The SIB1 can be transmitted on sub-frame #0 of the frame 330-1, and sub-frame #0 of the frame 330-3. For clarity of illustration, the respective sub-frame(s) used to transmit the PSS, the SSS, the MIB, and the SIB1 are filled with a diagonal stripe pattern, a dotted pattern, a vertical stripe pattern, and a horizontal stripe pattern, respectively. It is noted that the anchor carrier 310 and the non-anchor carrier 330 may be used in the NB-IoT system utilizing a time domain duplex (TDD) transmission mode, which causes the sub-frames used by the SIB1 to be respectively aligned with at least part of the sub-frames used by the PSS along the time domain.

Figure 3B:
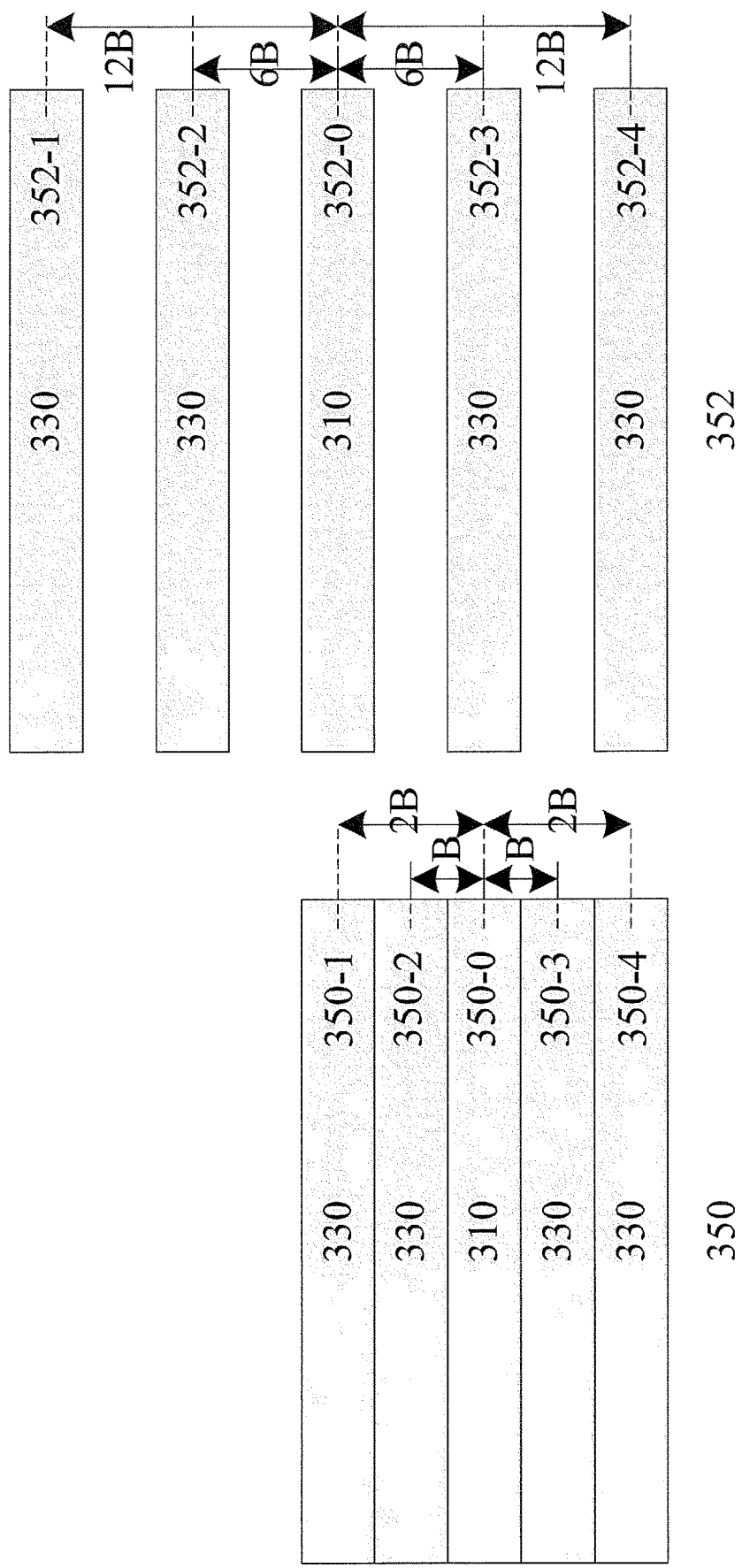
FIGS. 3B, 3C, and 3D each illustrates a plurality of frequency location options of the non-anchor carrier of FIG. 3A when used in a standalone mode and a non-standalone mode, respectively, in accordance with some embodiments of the present disclosure.
Figure 3C:
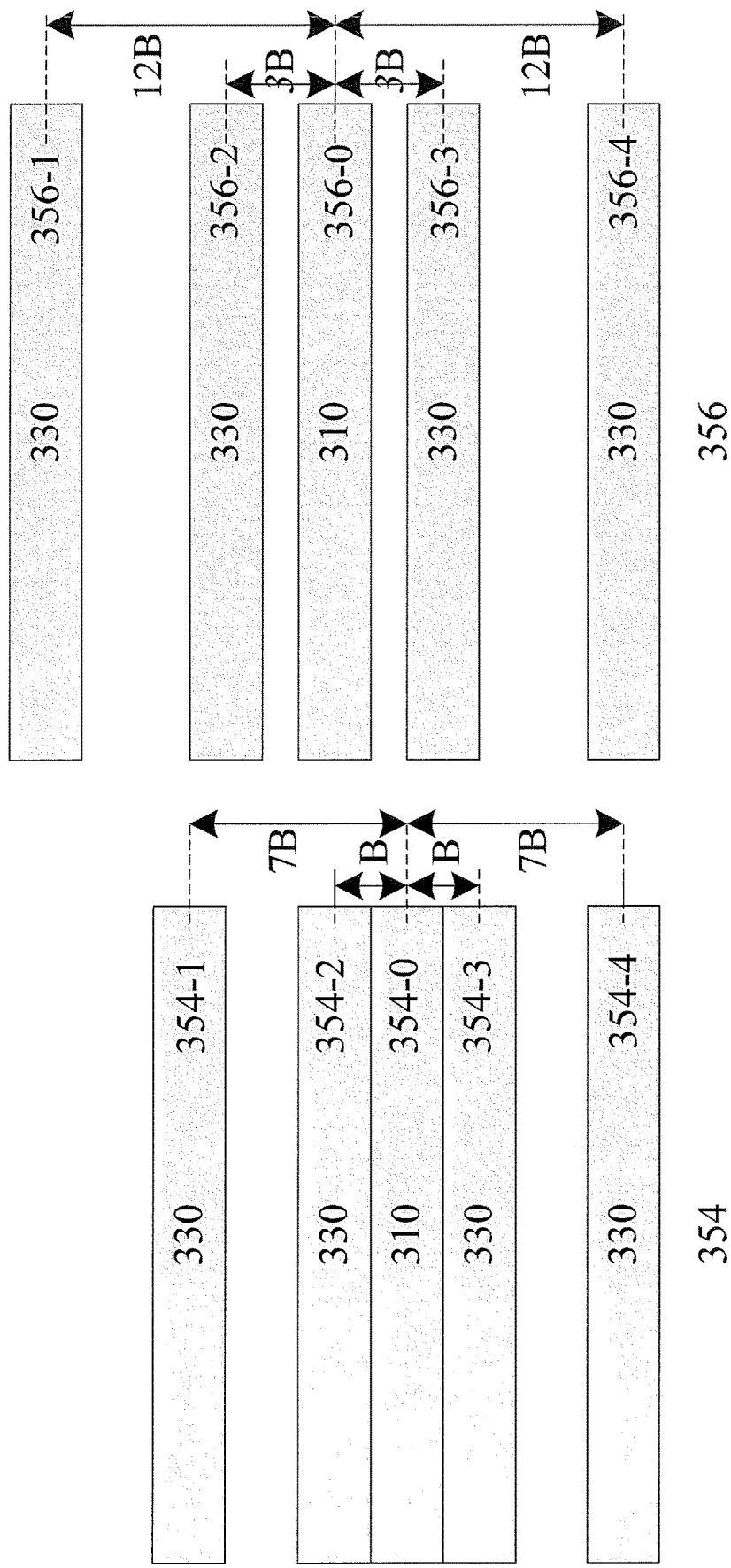
Figure 3D:
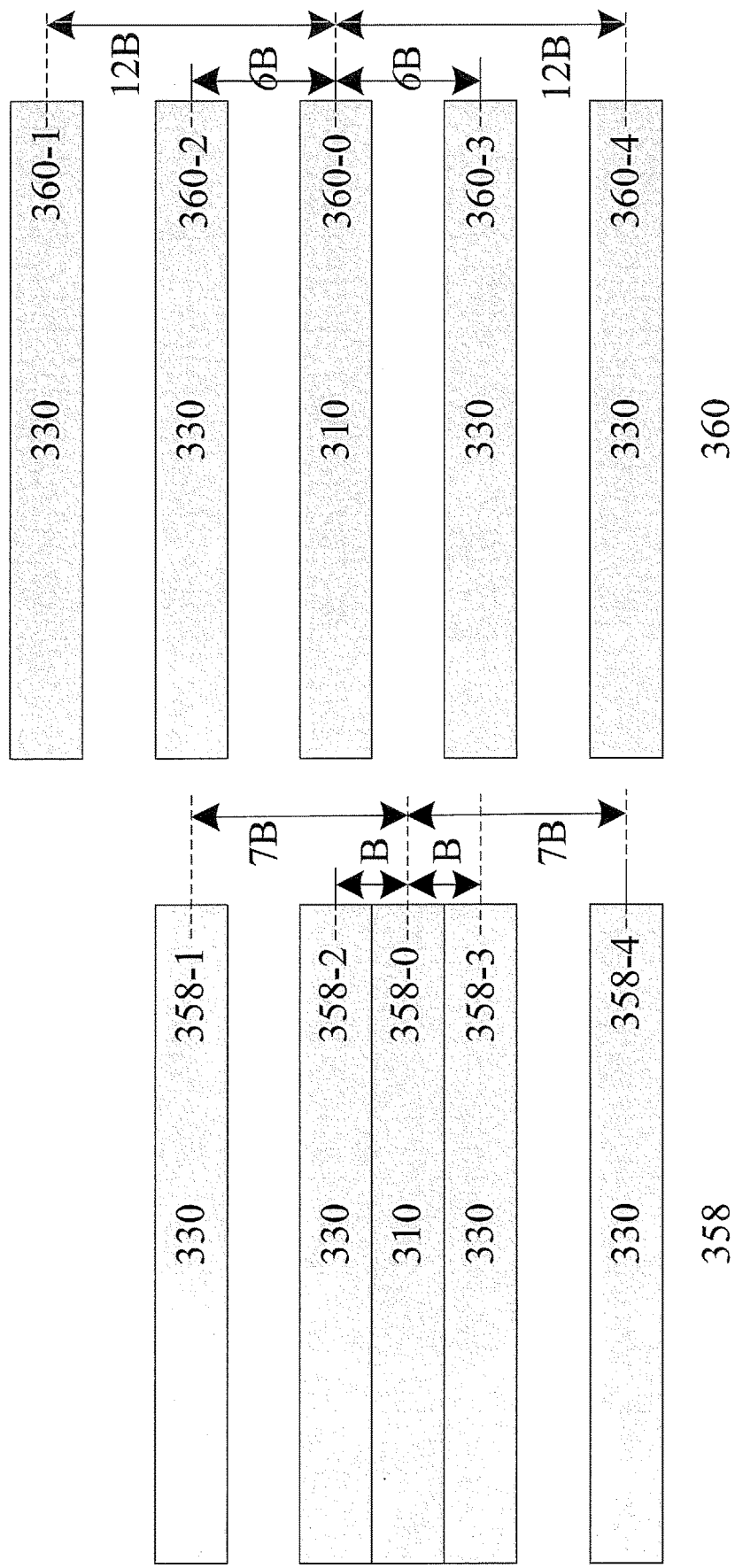

As mentioned above, in accordance with some embodiments of the present disclosure, one of the signals transmitted on the anchor carrier may indicate a frequency location of the non-anchor carrier from a plurality of frequency location options of the non-anchor carrier, wherein such a plurality of frequency location locations of the non-anchor carrier are pre-defined by the protocol of the NB-IoT system. FIGS. 3B, 3C, and 3D each provides two examples of such a plurality of frequency location options of the non-anchor carrier when the NB-IoT system operates under a standalone mode and a non-standalone mode, respectively. As understood by persons of ordinary skill in the art, when the NB-IoT system operates under the standalone mode, the anchor carrier 310 and the non-anchor carrier 330 each resides within Global System for Mobile Communication (GSM) frequencies; and when the NB-IoT system operates under the non-standalone mode, the anchor carrier 310 and the non-anchor carrier 330 each resides within Long-Term Evolution (LTE) frequencies.

Referring first to example 350 of FIG. 3B in which the NB-IoT system operates under the standalone mode, a plurality of options 350-1, 350-2, 350-3, and 350-4 of the frequency location of the non-anchor carrier 330 are provided with respect to frequency location 350-0 of the anchor carrier 310. As shown, the frequency location 350-1 of the non-anchor carrier 330 is positively spaced apart from the frequency location 350-0 of the anchor carrier 310 by 2 carrier bandwidths (i.e., 2×B); the frequency location 350-2 of the non-anchor carrier 330 is positively spaced apart from the frequency location 350-0 of the anchor carrier 310 by 1 carrier bandwidth (i.e., 1×B); the frequency location 350-3 of the non-anchor carrier 330 is negatively spaced apart from the frequency location 350-0 of the anchor carrier 310 by 1 carrier bandwidth (i.e., −1×B); and the frequency location 350-4 of the non-anchor carrier 330 is negatively spaced apart from the frequency location 350-0 of the anchor carrier 310 by 2 carrier bandwidths (i.e., −2×B).

In example 352 of FIG. 3B in which the NB-IoT system operates under the non-standalone mode, a plurality of options 352-1, 352-2, 352-3, and 352-4 of the frequency location of the non-anchor carrier 330 are provided with respect to frequency location 352-0 of the anchor carrier 310. As shown, the frequency location 352-1 of the non-anchor carrier 330 is positively spaced apart from the frequency location 352-0 of the anchor carrier 310 by 12 carrier bandwidths (i.e., 12×B); the frequency location 352-2 of the non-anchor carrier 330 is positively spaced apart from the frequency location 352-0 of the anchor carrier 310 by 6 carrier bandwidths (i.e., 6×B); the frequency location 352-3 of the non-anchor carrier 330 is negatively spaced apart from the frequency location 352-0 of the anchor carrier 310 by 6 carrier bandwidths (i.e., −6×B); and the frequency location 352-4 of the non-anchor carrier 330 is negatively spaced apart from the frequency location 352-0 of the anchor carrier 310 by 12 carrier bandwidths (i.e., −12×B).

According to the examples 350 and 352 provided in FIG. 3B, it is noted that when the NB-IoT system operates under the standalone mode, there is a first carrier bandwidth spacing between respective frequency locations of any two adjacent carriers (e.g., between respective frequency locations of one of the options of the non-anchor carrier 330 and the anchor carrier 310, between respective frequency locations of two adjacent options, for example, 350-1 and 350-2, of the non-anchor carrier 330, etc.); and when the NB-IoT system operates under the non-standalone mode, there is a second carrier bandwidth spacing between respective frequency locations of any two adjacent carriers (e.g., between respective frequency locations of one of the options of the non-anchor carrier 330 and the anchor carrier 310, between respective frequency locations of two adjacent options, for example, 352-1 and 352-2, of the non-anchor carrier 330, etc.). In some embodiments, the first carrier bandwidth spacing (e.g., B) is different from the second carrier bandwidth spacing (e.g., 6B).

In accordance with the illustrated embodiment of FIG. 3A, the MIB, transmitted using the anchor carrier 310 on the frequency location 350-0 or 352-0, may indicate the frequency location of the non-anchor carrier 330 by selecting one from either the plurality of frequency location options 350-1 to 350-4 or the plurality of frequency location options 352-1 to 352-4. As such, after the UE 104 (FIG. 1) receives and then read the MIB that is transmitted on the anchor carrier 310, the UE 104 can know using which frequency location to receive the SIB1 that is transmitted on the non-anchor carrier 330.

FIGS. 3C and 3D each provides other exemplary "distributions" of the frequency location of the non-anchor carrier 330 with respect to a respective frequency location of the anchor carrier 310 when the NB-IoT system switches to operate between the standalone mode and non-standalone mode, respectively. Since FIGS. 3C and 3D are substantially similar to FIG. 3B, discussions of FIGS. 3C and 3D are briefly provided as follows.

In example 354 of FIG. 3C in which the NB-IoT system operates under the standalone mode, a plurality of options 354-1, 354-2, 354-3, and 354-4 of the frequency location of the non-anchor carrier 330 are provided with respect to frequency location 354-0 of the anchor carrier 310. As shown, the frequency location 354-1 of the non-anchor carrier 330 is positively spaced apart from the frequency location 354-0 of the anchor carrier 310 by 7 carrier bandwidths (i.e., 7×B); the frequency location 354-2 of the non-anchor carrier 330 is positively spaced apart from the frequency location 354-0 of the anchor carrier 310 by 1 carrier bandwidth (i.e., 1×B); the frequency location 354-3 of the non-anchor carrier 330 is negatively spaced apart from the frequency location 354-0 of the anchor carrier 310 by 1 carrier bandwidth (i.e., −1×B); and the frequency location 354-4 of the non-anchor carrier 330 is negatively spaced apart from the frequency location 354-0 of the anchor carrier 310 by 72 carrier bandwidths (i.e., −7×B).

In example 356 of FIG. 3C in which the NB-IoT system operates under the non-standalone mode, a plurality of options 356-1, 356-2, 356-3, and 356-4 of the frequency location of the non-anchor carrier 330 are provided with respect to frequency location 356-0 of the anchor carrier 310. As shown, the frequency location 356-1 of the non-anchor carrier 330 is positively spaced apart from the frequency location 356-0 of the anchor carrier 310 by 12 carrier bandwidths (i.e., 12×B); the frequency location 356-2 of the non-anchor carrier 330 is positively spaced apart from the frequency location 356-0 of the anchor carrier 310 by 3 carrier bandwidths (i.e., 3×B); the frequency location 356-3 of the non-anchor carrier 330 is negatively spaced apart from the frequency location 356-0 of the anchor carrier 310 by 3 carrier bandwidths (i.e., −3×B); and the frequency location 356-4 of the non-anchor carrier 330 is negatively spaced apart from the frequency location 356-0 of the anchor carrier 310 by 12 carrier bandwidths (i.e., −12×B).

According to the examples 354 and 356 provided in FIG. 3C, it is noted that when the NB-IoT system operates under the standalone mode, there are two respective different carrier bandwidth spacings (first and second carrier bandwidth spacings) between respective frequency locations of any two adjacent carriers (e.g., between respective frequency locations of one of the options of the non-anchor carrier 330 and the anchor carrier 310, between respective frequency locations of two adjacent options, for example, 354-1 and 354-2, of the non-anchor carrier 330, etc.); and when the NB-IoT system operates under the non-standalone mode, there are two respective different carrier bandwidth spacings (third and fourth carrier bandwidth spacings) between respective frequency locations of any two adjacent carriers (e.g., between respective frequency locations of one of the options of the non-anchor carrier 330 and the anchor carrier 310, between respective frequency locations of two adjacent options, for example, 356-1 and 356-2, of the non-anchor carrier 330, etc.). In some embodiments, the first (e.g., B), second (e.g., 6B), third (e.g., 3B), and fourth (e.g., 9B) carrier bandwidth spacings are different from one another.

In example 358 of FIG. 3D in which the NB-IoT system operates under the standalone mode, a plurality of options 358-1, 358-2, 358-3, and 358-4 of the frequency location of the non-anchor carrier 330 are provided with respect to frequency location 358-0 of the anchor carrier 310. As shown, the frequency location 358-1 of the non-anchor carrier 330 is positively spaced apart from the frequency location 358-0 of the anchor carrier 310 by 7 carrier bandwidths (i.e., 7×B); the frequency location 358-2 of the non-anchor carrier 330 is positively spaced apart from the frequency location 358-0 of the anchor carrier 310 by 1 carrier bandwidth (i.e., 1×B); the frequency location 358-3 of the non-anchor carrier 330 is negatively spaced apart from the frequency location 358-0 of the anchor carrier 310 by 1 carrier bandwidth (i.e., −1×B); and the frequency location 358-4 of the non-anchor carrier 330 is negatively spaced apart from the frequency location 358-0 of the anchor carrier 310 by 7 carrier bandwidths (i.e., −7×B).

In example 360 of FIG. 3D in which the NB-IoT system operates under the non-standalone mode, a plurality of options 360-1, 360-2, 360-3, and 360-4 of the frequency location of the non-anchor carrier 330 are provided with respect to frequency location 360-0 of the anchor carrier 310. As shown, the frequency location 360-1 of the non-anchor carrier 330 is positively spaced apart from the frequency location 360-0 of the anchor carrier 310 by 12 carrier bandwidths (i.e., 12×B); the frequency location 360-2 of the non-anchor carrier 330 is positively spaced apart from the frequency location 360-0 of the anchor carrier 310 by 6 carrier bandwidths (i.e., 6×B); the frequency location 360-3 of the non-anchor carrier 330 is negatively spaced apart from the frequency location 360-0 of the anchor carrier 310 by 6 carrier bandwidths (i.e., −6×B); and the frequency location 360-4 of the non-anchor carrier 330 is negatively spaced apart from the frequency location 360-0 of the anchor carrier 310 by 12 carrier bandwidths (i.e., −12×B).

According to the examples 358 and 360 provided in FIG. 3D, it is noted that when the NB-IoT system operates under the standalone mode, there are respective different carrier bandwidth spacings (first and second carrier bandwidth spacings) between respective frequency locations of any two adjacent carriers (e.g., between respective frequency locations of one of the options of the non-anchor carrier 330 and the anchor carrier 310, between respective frequency locations of two adjacent options, for example, 358-1 and 358-2, of the non-anchor carrier 330, etc.); and when the NB-IoT system operates under the non-standalone mode, there is a single carrier bandwidth spacing (third carrier bandwidth spacing) between respective frequency locations of any two adjacent carriers (e.g., between respective frequency locations of one of the options of the non-anchor carrier 330 and the anchor carrier 310, between respective frequency locations of two adjacent options, for example, 360-1 and 360-2, of the non-anchor carrier 330, etc.). In some embodiments, each of the first and second carrier bandwidth spacings (e.g., B and 6B) may be different from or identical to the third carrier bandwidth spacing (e.g., 6B). In some alternative embodiments, when the NB-IoT system operates under the standalone mode, there may be a single carrier bandwidth spacing between respective frequency locations of any two adjacent carriers; and when the NB-IoT system operates under the non-standalone mode, there may be respective different carrier bandwidth spacings between respective frequency locations of any two adjacent carriers.

Similarly, in accordance with the illustrated embodiment of FIG. 3A, the MIB, transmitted using the anchor carrier 310 on the frequency location (e.g., 354-0, 356-0, 358-0, or 360-0), may indicate the frequency location of the non-anchor carrier 330 by selecting one from the plurality of corresponding frequency location options (e.g., 354-1 to 354-4, 356-1 to 356-4, 358-1 to 358-4, or 360-1 to 360-4). As such, after the UE 104 (FIG. 1) receives and then read the MIB that is transmitted on the anchor carrier 310, the UE 104 can know using which of the frequency locations to receive the SIB1 that is transmitted on the non-anchor carrier 330.

Figure 4:
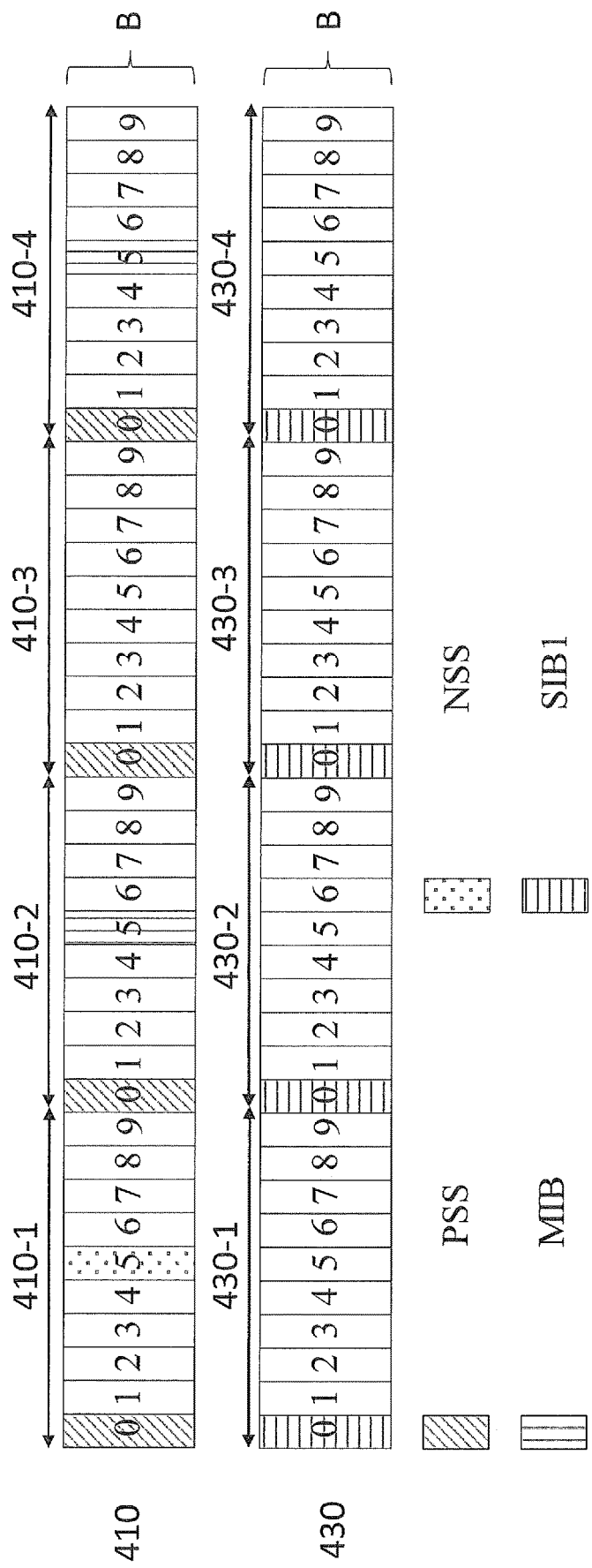
FIG. 4 illustrates exemplary frame structures of an anchor carrier and a non-anchor carrier, respectively, in accordance with some embodiments of the present disclosure.

FIG. 4 illustrates exemplary frame structures of an anchor carrier 410 and a non-anchor carrier 430, respectively, in accordance with some embodiments of the present disclosure. Similarly, the anchor carrier 410 and the non-anchor carrier 430 share the same carrier bandwidth "B" (e.g., 180 kHz) along the frequency domain. In some embodiments, the anchor carrier 410 and the non-anchor carrier 430 may occupy respective different frequency ranges. Alternatively stated, the anchor carrier 410 and the non-anchor carrier 430 may be spaced from each other by one or more carrier bandwidths B, which will be discussed in further detail below.

In the illustrated embodiment of FIG. 4, the anchor carrier 410 includes frames 410-1, 410-2, 410-3, and 410-4 coupled from one to another along a time domain; and the non-anchor carrier 430 includes frames 430-1, 430-2, 430-3, and 430-4 coupled from one to another along the time domain. In some embodiments, each of the respective frames of the anchor carrier 410 and the non-anchor carrier 430 includes 10 sub-frames, each of which is associated with a sub-frame index #, e.g., 0, 1, 2, 3, 4, 5, 6, 7, 8, or 9. Further, in the illustrated embodiment of FIG. 4, the synchronization signals, including the PSS and the SSS, and part of the public signals, including the MIB, are transmitted on the anchor carrier 410; and part of the public signals, including the SIB1, are transmitted on the non-anchor carrier 430.

More specifically, in some embodiments, the PSS is transmitted on sub-frame #0 of the frame 410-1, sub-frame #0 of the frame 410-2, sub-frame #0 of the frame 410-3, and sub-frame #0 of the frame 410-4; the SSS is transmitted on sub-frame #5 of the frame 410-1; and the MIB is transmitted on sub-frame #5 of the frame 410-2, and sub-frame #5 of the frame 410-4. The SIB1 can be transmitted on sub-frame #0 of the frame 430-1, sub-frame #0 of the frame 430-2, sub-frame #0 of the frame 430-3, and sub-frame #0 of the frame 430-4. For clarity of illustration, the respective sub-frame(s) used to transmit the PSS, the SSS, the MIB, and the SIB1 are filled with a diagonal stripe pattern, a dotted pattern, a vertical stripe pattern, and a horizontal stripe pattern, respectively. It is noted that the anchor carrier 410 and the non-anchor carrier 430 may be used in the NB-IoT system utilizing the TDD transmission mode, which causes the sub-frames used by the SIB1 to be respectively aligned with at least part of the sub-frames used by the PSS along the time domain.

When compared to the frame structure of the non-anchor carrier 330 of FIG. 3A, the frame structure of the non-anchor carrier 430 of FIG. 4 includes more sub-frames that can be used to transmit the SIB. As such, when the BS 102 uses the frame structure of the non-anchor carrier 430 of FIG. 4 to transmit the SIB1, the UE 104 may responsively spend less time decoding the SIB1; and when the BS 102 uses the frame structure of the non-anchor carrier 330 of FIG. 3A to transmit the SIB1, the UE 104 may responsively spend more time decoding the SIB1. In some embodiments, based on the respective decoding requirements, the BS 102 may determine which of the frame structures between 330 and 430 for the use of transmitting the SIB1. As a choice, the BS 102 may use the MIB to indicate which sub-frame(s) in the non-anchor carrier (330 or 430) has been used to transmit the SIB1. For example, the MIB uses how many times the SIB1 is going to be repeatedly transmitted within a scheduling period to implicitly indicate which sub-frame(s) will be used to transmit the SIB1. In particular, when a number of times falls into a first subset, the SIB1 is going to be transmitted using the sub-frames as shown in FIG. 3A; and when the number of times falls into a second subset, the SIB1 is going to be transmitted using the sub-frames as shown in FIG. 4.

In accordance with the illustrated embodiment of FIG. 4, neither the PSS, nor the SSS, nor the MIB, transmitted using the anchor carrier 410 on a respective frequency location (not shown), indicates the frequency location of the non-anchor carrier 430. Instead, the frequency location of the non-anchor carrier 430 with respect to the frequency location of the anchor carrier 410 may be pre-defined by the above-mentioned protocol of the NB-IoT system. For example, when the NB-IoT system operates under the standalone mode, the frequency location of the non-anchor carrier 430 may be pre-defined to be positively or negatively spaced apart from the frequency location of the anchor carrier 410 by 1 carrier bandwidth (i.e., 1×B or −1×B); and when the NB-IoT system operates under the non-standalone mode, the frequency location of the non-anchor carrier 430 may be pre-defined to be positively or negatively spaced apart from the frequency location of the anchor carrier 410 by 6 carrier bandwidths (i.e., 6×B or −6×B).

Figure 5:
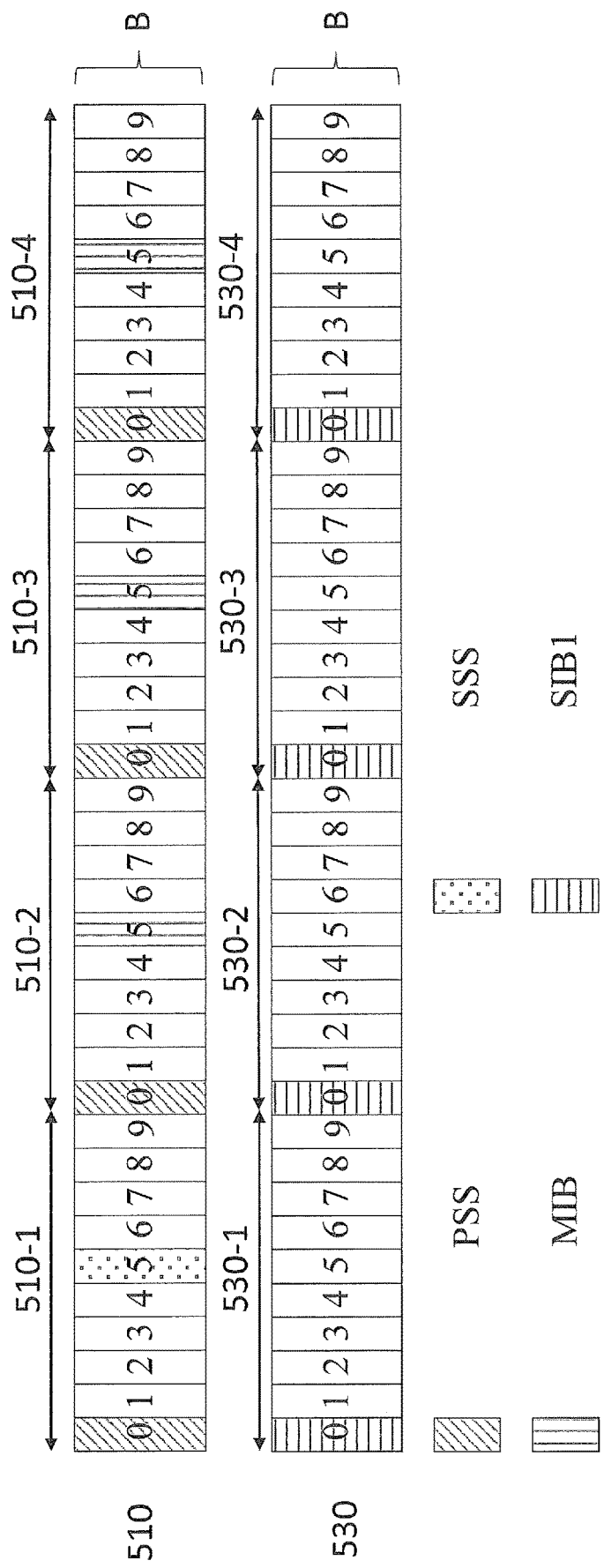
FIG. 5 illustrates exemplary frame structures of an anchor carrier and a non-anchor carrier, respectively, in accordance with some embodiments of the present disclosure.

FIG. 5 illustrates exemplary frame structures of an anchor carrier 510 and a non-anchor carrier 530, respectively, in accordance with some embodiments of the present disclosure. Similarly, the anchor carrier 510 and the non-anchor carrier 530 share the same carrier bandwidth "B" (e.g., 180 kHz) along the frequency domain. In some embodiments, the anchor carrier 510 and the non-anchor carrier 530 may occupy respective different frequency ranges. Alternatively stated, respective frequency locations of the anchor carrier 510 and the non-anchor carrier 530 may be spaced from each other by one or more carrier bandwidths B, which will be discussed in further detail below.

In the illustrated embodiment of FIG. 5, the anchor carrier 510 includes frames 510-1, 510-2, 510-3, and 510-4 coupled from one to another along a time domain; and the non-anchor carrier 530 includes frames 530-1, 530-2, 530-3, and 530-4 coupled from one to another along the time domain. In some embodiments, each of the respective frames of the anchor carrier 510 and the non-anchor carrier 530 includes 10 sub-frames, each of which is associated with a sub-frame index #, e.g., 0, 1, 2, 3, 4, 5, 6, 7, 8, or 9. Further, in the illustrated embodiment of FIG. 5, the synchronization signals, including the PSS and the SSS, and part of the public signals, including the MIB, are transmitted on the anchor carrier 510; and part of the public signals, including the SIB1, are transmitted on the non-anchor carrier 530.

More specifically, in some embodiments, the PSS is transmitted on sub-frame #0 of the frame 510-1, sub-frame #0 of the frame 510-2, sub-frame #0 of the frame 510-3, and sub-frame #0 of the frame 510-4; the SSS is transmitted on sub-frame #5 of the frame 510-1; and the MIB is transmitted on sub-frame #5 of the frame 510-2, sub-frame #5 of the frame 510-3, and sub-frame #5 of the frame 510-4. The SIB1 can be transmitted on sub-frame #0 of the frame 530-1, sub-frame #0 of the frame 530-2, sub-frame #0 of the frame 530-3, and sub-frame #0 of the frame 530-4. For clarity of illustration, the respective sub-frame(s) used to transmit the PSS, the SSS, the MIB, and the SIB1 are filled with a diagonal stripe pattern, a dotted pattern, a vertical stripe pattern, and a horizontal stripe pattern, respectively. It is noted that the anchor carrier 510 and the non-anchor carrier 530 may be used in the NB-IoT system utilizing the TDD transmission mode, which causes the sub-frames used by the SIB1 to be respectively aligned with at least part of the sub-frames used by the PSS along the time domain.

When compared to the frame structure of the anchor carrier 410 of FIG. 4, the frame structure of the anchor carrier 510 of FIG. 5 includes more sub-frames that can be used to transmit the MIB. As such, when the BS 102 uses the frame structure of the anchor carrier 410 of FIG. 4 to transmit the MIB, the UE 104 may responsively spend more time decoding the MIB; and when the BS 102 uses the frame structure of the anchor carrier 510 of FIG. 5 to transmit the MIB, the UE 104 may responsively spend less time decoding the MIB. In some embodiments, based on the respective decoding requirements, the BS 102 may determine which of the frame structures between 410 and 510 for the use of transmitting the MIB. As a choice, the UE 104 may blindly decode which of the sub-frames(s) in the 410 or 510 have been used to transmit the MIB.

In accordance with the illustrated embodiment of FIG. 5, the SSS, transmitted using the anchor carrier 510 on a respective frequency location (not shown), may indicate the frequency location of the non-anchor carrier 530 by selecting one from a plurality of pre-defined frequency location options, as discussed above with respect to FIGS. 3B, 3C, and 3D. As such, after the UE 104 (FIG. 1) receives the SSS that is transmitted on the anchor carrier 510, the UE 104 can know using which frequency location to receive the SIB1 that is transmitted on the non-anchor carrier 530.

Further, in such an embodiment of using the SSS to indicate the frequency location of the non-anchor carrier 530, the BS 102 may use the frequency location of the non-anchor carrier 530 to determine a sequence "d(n)" of the SSS. Accordingly, the UE 104 may use the sequence d(n) of the SSS to estimate the indicated frequency location of the non-anchor carrier 530. In particular, the UE may use the following equation of the sequence d(n) of the SSS to estimate the indicated frequency location of the non-anchor carrier 530.

$$d(n) = b_q(m)e^{-j2\pi\theta_f n}e^{-j\frac{\pi u n'(n'+1)}{131}}$$

$$n = 0, 1, \ldots, 131$$

$$n' = n \bmod 131$$

$$m = n \bmod 128$$

$$\text{wherein } u = N_{ID}^{Ncell} \bmod 126 + 3$$

$$q = \left\lfloor \frac{N_{ID}^{Ncell}}{126} \right\rfloor$$

$$\theta_f = \frac{33}{132}i$$

Further, $N_{ID}^{Ncell}$ represents a physical cell identity (e.g., a value between 0~503); $b_q(m)$ represents a pre-defined sequence, where q can be 1, 2, or 3; i represents an index of the plurality of pre-defined frequency location options (e.g., 0, 1, 2, 3 in the current example).

Figure 6:
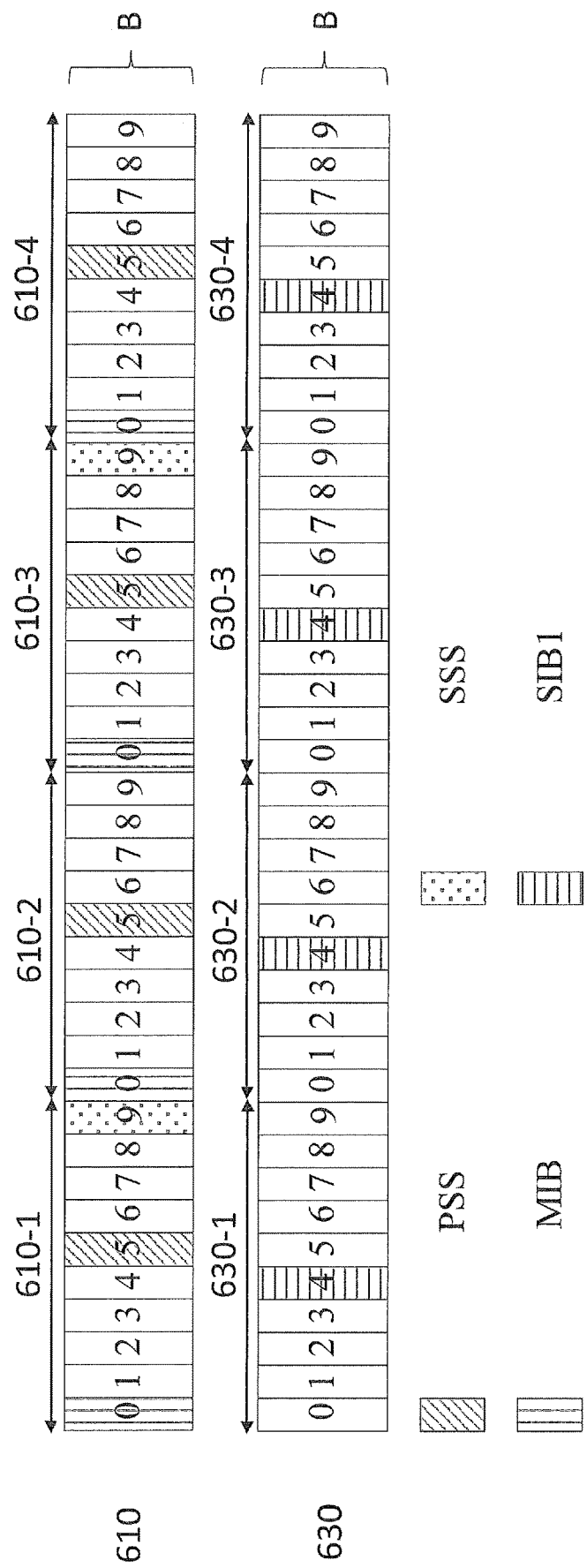
FIG. 6 illustrates exemplary frame structures of an anchor carrier and a non-anchor carrier, respectively, in accordance with some embodiments of the present disclosure.

FIG. 6 illustrates exemplary frame structures of an anchor carrier 610 and a non-anchor carrier 630, respectively, in accordance with some embodiments of the present disclosure. Similarly, the anchor carrier 610 and the non-anchor carrier 630 share the same carrier bandwidth "B" (e.g., 180 kHz) along the frequency domain. In some embodiments, the anchor carrier 610 and the non-anchor carrier 630 may occupy respective different frequency ranges. Alternatively stated, the anchor carrier 610 and the non-anchor carrier 630 may be spaced from each other by one or more carrier bandwidths B, which will be discussed in further detail below.

In the illustrated embodiment of FIG. 6, the anchor carrier 610 includes frames 610-1, 610-2, 610-3, and 610-4 coupled from one to another along a time domain; and the non-anchor carrier 630 includes frames 630-1, 630-2, 630-3, and 630-4 coupled from one to another along the time domain. In some embodiments, each of the respective frames of the anchor carrier 610 and the non-anchor carrier 630 includes 10 sub-frames, each of which is associated with a sub-frame index #, e.g., 0, 1, 2, 3, 4, 5, 6, 7, 8, or 9. Further, in the illustrated embodiment of FIG. 6, the synchronization signals, including the PSS and the SSS, and part of the public signals, including the MIB, are transmitted on the anchor carrier 610; and part of the public signals, including the SIB1, are transmitted on the non-anchor carrier 630.

More specifically, in some embodiments, the PSS is transmitted on sub-frame #5 of the frame 610-1, sub-frame #5 of the frame 610-2, sub-frame #5 of the frame 610-3, and sub-frame #5 of the frame 610-4; the SSS is transmitted on sub-frame #9 of the frame 610-1 and sub-frame #9 of the frame 610-3; and the MIB is transmitted on sub-frame #0 of the frame 610-1, sub-frame #0 of the frame 610-2, sub-frame #0 of the frame 610-3, and sub-frame #0 of the frame 610-4. The SIB1 can be transmitted on sub-frame #4 of the frame 630-1, sub-frame #4 of the frame 630-2, sub-frame #4 of the frame 630-3, and sub-frame #4 of the frame 630-4. For clarity of illustration, the respective sub-frame(s) used to transmit the PSS, the SSS, the MIB, and the SIB1 are filled with a diagonal stripe pattern, a dotted pattern, a vertical stripe pattern, and a horizontal stripe pattern, respectively. It is noted that the anchor carrier 610 and the non-anchor carrier 630 may be used in the NB-IoT system utilizing a frequency domain duplex (FDD) transmission mode.

In accordance with the illustrated embodiment of FIG. 6, the MIB, transmitted using the anchor carrier 610 on a respective frequency location, may indicate the frequency location of the non-anchor carrier 630 by selecting one from a plurality of pre-defined frequency location options. As such, after the UE 104 (FIG. 1) receives and then read the MIB that is transmitted on the anchor carrier 610, the UE 104 can know using which frequency location to receive the SIB1 that is transmitted on the non-anchor carrier 630.

Figure 7:
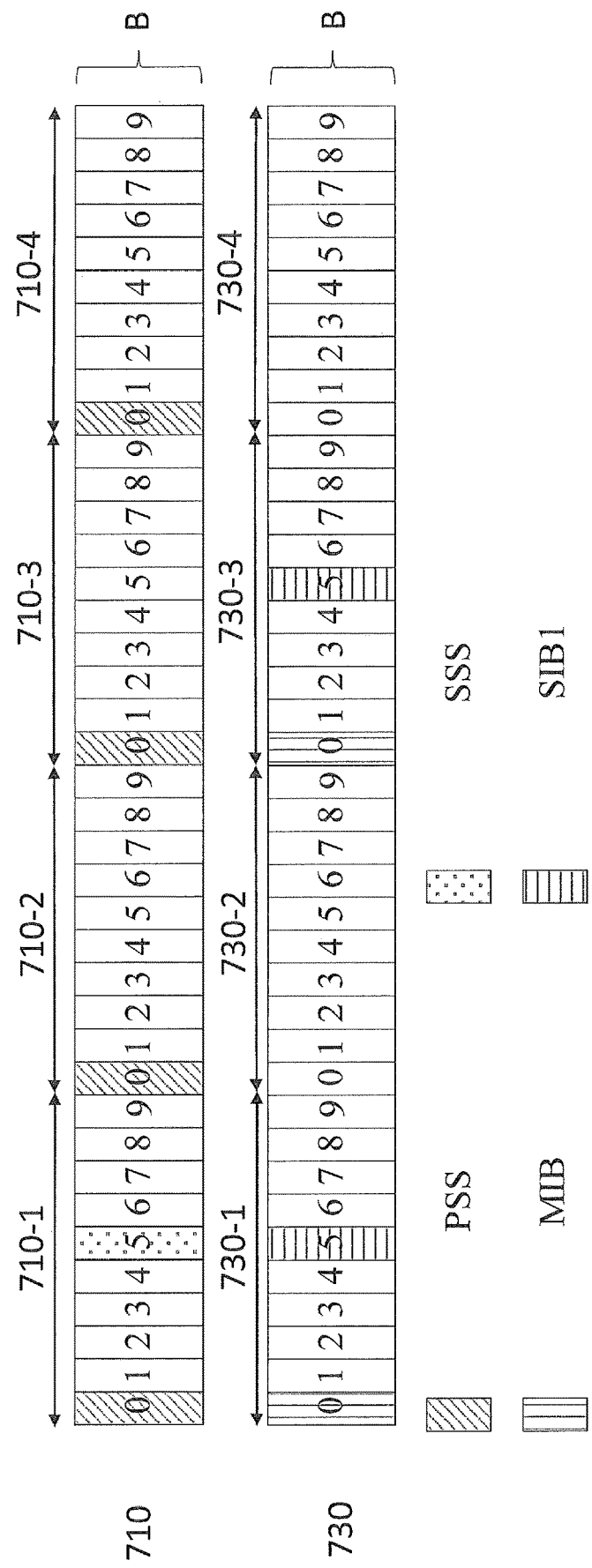
FIG. 7 illustrates exemplary frame structures of an anchor carrier and a non-anchor carrier, respectively, in accordance with some embodiments of the present disclosure.

FIG. 7 illustrates exemplary frame structures of an anchor carrier 710 and a non-anchor carrier 730 used to transmit the synchronization signals and public signals, respectively, in accordance with some embodiments of the present disclosure. Similarly, the anchor carrier 710 and the non-anchor carrier 730 share the same carrier bandwidth "B" (e.g., 180 kHz) along the frequency domain. In some embodiments, the anchor carrier 710 and the non-anchor carrier 730 may occupy respective different frequency ranges. Alternatively stated, respective frequency locations of the anchor carrier 710 and the non-anchor carrier 730 may be spaced from each other by one or more carrier bandwidths B, which will be discussed in further detail below.

In the illustrated embodiment of FIG. 7, the anchor carrier 710 includes frames 710-1, 710-2, 710-3, and 710-4 coupled from one to another along a time domain; and the non-anchor carrier 730 includes frames 730-1, 730-2, 730-3, and 730-4 coupled from one to another along the time domain. In some embodiments, each of the respective frames of the anchor carrier 710 and the non-anchor carrier 730 includes 10 sub-frames, each of which is associated with a sub-frame index #, e.g., 0, 1, 2, 3, 4, 5, 6, 7, 8, or 9. Further, in the illustrated embodiment of FIG. 7, the synchronization signals, including the PSS and the SSS, are transmitted on the anchor carrier 710; and the public signals, including the MIB and SIB1, are transmitted on the non-anchor carrier 730.

More specifically, in some embodiments, the PSS is transmitted on sub-frame #0 of the frame 710-1, sub-frame #0 of the frame 710-2, sub-frame #0 of the frame 710-3, and sub-frame #0 of the frame 710-4; and the SSS is transmitted on sub-frame #5 of the frame 710-1. The MIB is transmitted on sub-frame #0 of the frame 730-1, and sub-frame #0 of the frame 730-3; and the SIB1 can be transmitted on sub-frame #5 of the frame 730-1, and sub-frame #5 of the frame 730-3. For clarity of illustration, the respective sub-frame(s) used to transmit the PSS, the SSS, the MIB, and the SIB1 are filled with a diagonal stripe pattern, a dotted pattern, a vertical stripe pattern, and a horizontal stripe pattern, respectively. It is noted that the anchor carrier 710 and the non-anchor carrier 730 may be used in the NB-IoT system utilizing the TDD transmission mode, which causes the sub-frames used by the MIB to be respectively aligned with at least part of the sub-frames used by the PSS along the time domain.

In accordance with the illustrated embodiment of FIG. 7, neither the PSS nor the SSS, transmitted using the anchor carrier 710 on a respective frequency location (not shown), indicates the frequency location of the non-anchor carrier 730. Instead, the frequency location of the non-anchor carrier 730 with respect to the frequency location of the anchor carrier 710 may be pre-defined by the above-mentioned protocol of the NB-IoT system. For example, when the NB-IoT system operates under the standalone mode, the frequency location of the non-anchor carrier 730 may be pre-defined to be positively or negatively spaced apart from the frequency location of the anchor carrier 710 by 1 carrier bandwidth (i.e., 1×B or −1×B); and when the NB-IoT system operates under the non-standalone mode, the frequency location of the non-anchor carrier 730 may be pre-defined to be positively or negatively spaced apart from the frequency location of the anchor carrier 710 by 6 carrier bandwidths (i.e., 6×B or −6×B).

Figure 8:
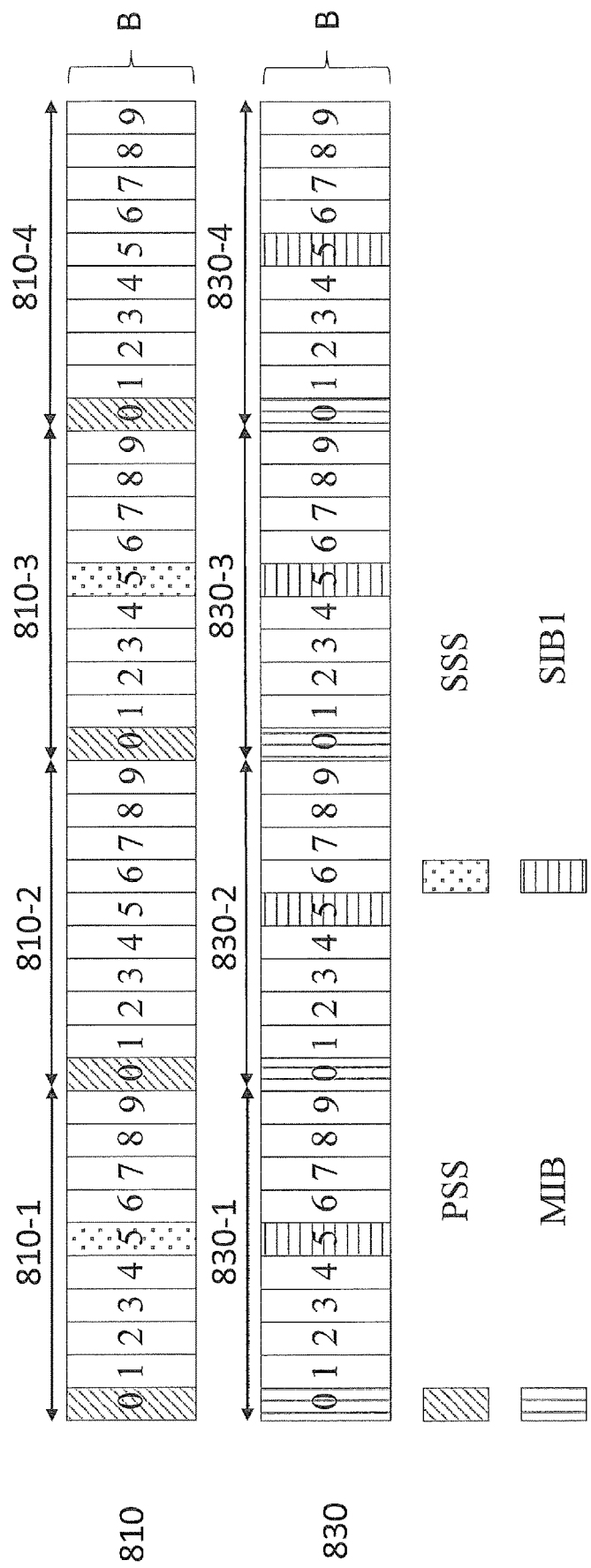
FIG. 8 illustrates exemplary frame structures of an anchor carrier and a non-anchor carrier, respectively, in accordance with some embodiments of the present disclosure.

FIG. 8 illustrates exemplary frame structures of an anchor carrier 810 and a non-anchor carrier 830 used to transmit the synchronization signals and public signals, respectively, in accordance with some embodiments of the present disclosure. Similarly, the anchor carrier 810 and the non-anchor carrier 830 share the same carrier bandwidth "B" (e.g., 180 kHz) along the frequency domain. In some embodiments, the anchor carrier 810 and the non-anchor carrier 830 may occupy respective different frequency ranges. Alternatively stated, respective frequency locations of the anchor carrier 810 and the non-anchor carrier 830 may be spaced from each other by one or more carrier bandwidths B, which will be discussed in further detail below.

In the illustrated embodiment of FIG. 8, the anchor carrier 810 includes frames 810-1, 810-2, 810-3, and 810-4 coupled from one to another along a time domain; and the non-anchor carrier 830 includes frames 830-1, 830-2, 830-3, and 830-4 coupled from one to another along the time domain. In some embodiments, each of the respective frames of the anchor carrier 810 and the non-anchor carrier 830 includes 10 sub-frames, each of which is associated with a sub-frame index #, e.g., 0, 1, 2, 3, 4, 5, 6, 7, 8, or 9. Further, in the illustrated embodiment of FIG. 8, the synchronization signals, including the PSS and the SSS, are transmitted on the anchor carrier 810; and the public signals, including the MIB and SIB1, are transmitted on the non-anchor carrier 830.

More specifically, in some embodiments, the PSS is transmitted on sub-frame #0 of the frame 810-1, sub-frame #0 of the frame 810-2, sub-frame #0 of the frame 810-3, and sub-frame #0 of the frame 810-4; and the SSS is transmitted on sub-frame #5 of the frame 810-1 and sub-frame #5 of the frame 810-3. The MIB is transmitted on sub-frame #0 of the frame 830-1, sub-frame #0 of the frame 830-2, sub-frame #0 of the frame 830-3, and sub-frame #0 of the frame 830-4; and the SIB1 can be transmitted on sub-frame #5 of the frame 830-1, sub-frame #5 of the frame 830-2, sub-frame #5 of the frame 830-3, and sub-frame #5 of the frame 830-4. For clarity of illustration, the respective sub-frame(s) used to transmit the PSS, the SSS, the MIB, and the SIB1 are filled with a diagonal stripe pattern, a dotted pattern, a vertical stripe pattern, and a horizontal stripe pattern, respectively. It is noted that the anchor carrier 810 and the non-anchor carrier 830 may be used in the NB-IoT system utilizing the TDD transmission mode, which causes the sub-frames used by the MIB to be respectively aligned with at least part of the sub-frames used by the PSS along the time domain.

When compared to the frame structure of the non-anchor carrier 730 of FIG. 7, the frame structure of the non-anchor carrier 830 of FIG. 8 includes more sub-frames that can be used to transmit the MIB. As such, when the BS 102 uses the frame structure of the non-anchor carrier 730 of FIG. 7 to transmit the MIB, the UE 104 may responsively spend more time decoding the MIB; and when the BS 102 uses the frame structure of the non-anchor carrier 830 of FIG. 8 to transmit the MIB, the UE 104 may responsively spend less time decoding the MIB. In some embodiments, based on the respective decoding requirements, the BS 102 may determine which of the frame structures between 730 and 830 for the use of transmitting the MIB. As a choice, the UE 104 may blindly decode which of the sub-frames(s) in the 730 or 830 have been used to transmit the MIB.

Further, when compared to the frame structure of the non-anchor carrier 730 of FIG. 7, the frame structure of the non-anchor carrier 830 of FIG. 8 includes more sub-frames that can be used to transmit the SIB1. As such, when the BS 102 uses the frame structure of the non-anchor carrier 830 of FIG. 8 to transmit the SIB1, the UE 104 may responsively spend less time decoding the SIB1; and when the BS 102 uses the frame structure of the non-anchor carrier 730 of FIG. 7 to transmit the SIB1, the UE 104 may responsively spend more time decoding the SIB1. In some embodiments, based on the respective decoding requirements, the BS 102 may determine which of the frame structures between 730 and 830 for the use of transmitting the SIB1. As a choice, the BS 102 may use the MIB to indicate which sub-frame(s) in the non-anchor carrier (730 or 830) has been used to transmit the SIB1. For example, the MIB uses how many times the SIB1 is going to be repeatedly transmitted within a scheduling period to implicitly indicate which sub-frame(s) will be used to transmit the SIB1. In particular, when a number of times falls into a first subset, the SIB1 is going to be transmitted using the sub-frames as shown in FIG. 7; and when the number of times falls into a second subset, the SIB1 is going to be transmitted using the sub-frames as shown in FIG. 8.

In accordance with the illustrated embodiment of FIG. 8, the SSS, transmitted using the anchor carrier 810 on a respective frequency location (not shown), may indicate the frequency location of the non-anchor carrier 830 by selecting one from a plurality of pre-defined frequency location options, as discussed above with respect to FIGS. 3B, 3C, and 3D. As such, after the UE 104 (FIG. 1) receives the SSS that is transmitted on the anchor carrier 810, the UE 104 can know using which frequency location to receive the SIB1 that is transmitted on the non-anchor carrier 830.

Further, in such an embodiment of using the SSS to indicate the frequency location of the non-anchor carrier 830, the BS 102 may use the frequency location of the non-anchor carrier 830 to determine a sequence "d(n)" of the SSS. Accordingly, the UE 104 may use the sequence d(n) of the SSS to estimate the indicated frequency location of the non-anchor carrier 830. In particular, the UE may use the following equation of the sequence d(n) of the SSS to estimate the indicated frequency location of the non-anchor carrier 830.

$$d(n) = b_q(m)e^{-j2\pi\theta_f n}e^{-j\frac{\pi u n'(n'+1)}{131}}$$

$$n = 0, 1, \ldots, 131$$

$$n' = n \bmod 131$$

$$m = n \bmod 128$$

wherein $u = N_{ID}^{Ncell} \bmod 126 + 3$ $$q = \left\lfloor \frac{N_{ID}^{Ncell}}{126} \right\rfloor$$

$$\theta_f = \frac{33}{132}i$$

Further, $N_{ID}^{Ncell}$ represents a physical cell identity (e.g., a value between 0~503); $b_q(m)$ represents a pre-defined sequence, where q can be 1, 2, or 3; i represents an index of the plurality of pre-defined frequency location options (e.g., 0, 1, 2, 3 in the current example).

Figure 9:
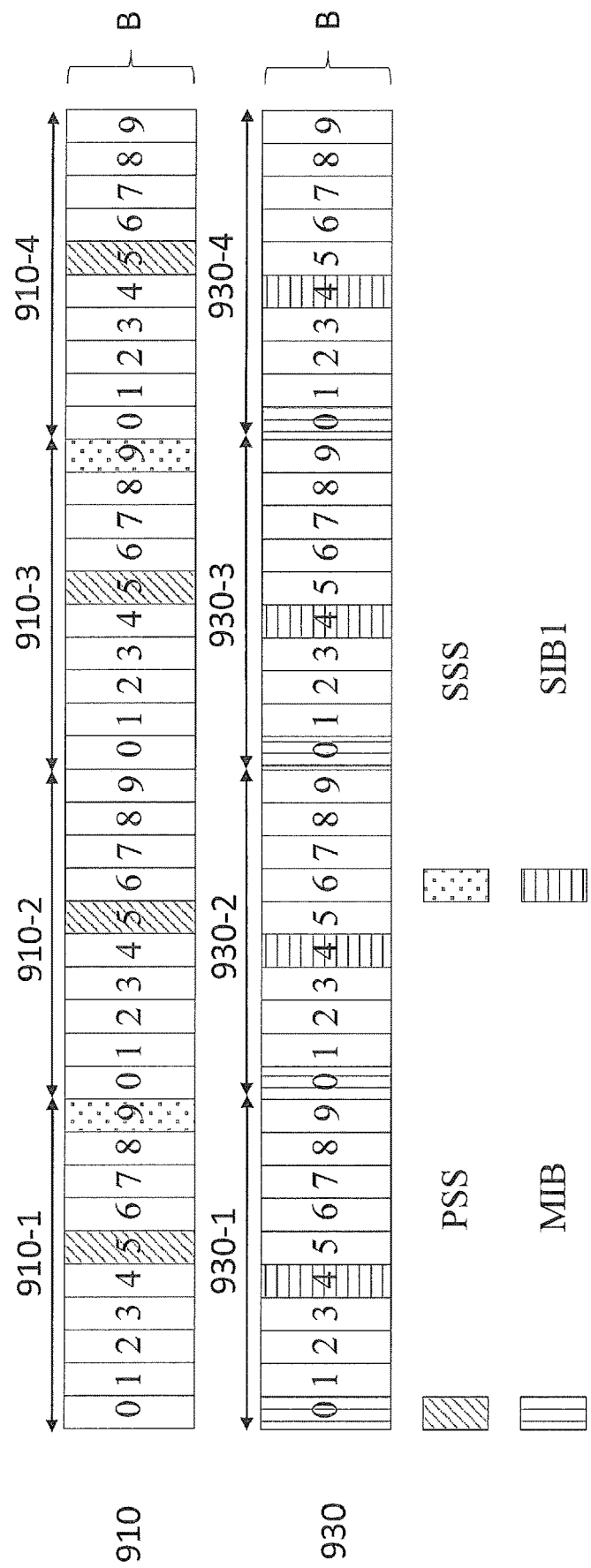
FIG. 9 illustrates exemplary frame structures of an anchor carrier and a non-anchor carrier, respectively, in accordance with some embodiments of the present disclosure.

FIG. 9 illustrates exemplary frame structures of an anchor carrier 910 and a non-anchor carrier 930 used to transmit the synchronization signals and public signals, respectively, in accordance with some embodiments of the present disclosure. Similarly, the anchor carrier 910 and the non-anchor carrier 930 share the same carrier bandwidth "B" (e.g., 180 kHz) along the frequency domain. In some embodiments, the anchor carrier 910 and the non-anchor carrier 930 may occupy respective different frequency ranges. Alternatively stated, respective frequency locations of the anchor carrier 910 and the non-anchor carrier 930 may be spaced from each other by one or more carrier bandwidths B, which will be discussed in further detail below.

In the illustrated embodiment of FIG. 9, the anchor carrier 910 includes frames 910-1, 910-2, 910-3, and 910-4 coupled from one to another along a time domain; and the non-anchor carrier 830 includes frames 930-1, 930-2, 930-3, and 930-4 coupled from one to another along the time domain. In some embodiments, each of the respective frames of the anchor carrier 910 and the non-anchor carrier 930 includes 10 sub-frames, each of which is associated with a sub-frame index #, e.g., 0, 1, 2, 3, 4, 5, 6, 7, 8, or 9. Further, in the illustrated embodiment of FIG. 9, the synchronization signals, including the PSS and the SSS, are transmitted on the anchor carrier 910; and the public signals, including the MIB and SIB1, are transmitted on the non-anchor carrier 930.

More specifically, in some embodiments, the PSS is transmitted on sub-frame #5 of the frame 910-1, sub-frame #5 of the frame 910-2, sub-frame #5 of the frame 910-3, and sub-frame #5 of the frame 910-4; and the SSS is transmitted on sub-frame #9 of the frame 910-2 and sub-frame #9 of the frame 910-3. The MIB is transmitted on sub-frame #0 of the frame 930-1, sub-frame #0 of the frame 930-2, sub-frame #0 of the frame 930-3, and sub-frame #0 of the frame 930-4; and the SIB1 can be transmitted on sub-frame #4 of the frame 930-1, sub-frame #4 of the frame 930-2, sub-frame #4 of the frame 930-3, and sub-frame #4 of the frame 930-4. For clarity of illustration, the respective sub-frame(s) used to transmit the PSS, the SSS, the MIB, and the SIB1 are filled with a diagonal stripe pattern, a dotted pattern, a vertical stripe pattern, and a horizontal stripe pattern, respectively. It is noted that the anchor carrier 910 and the non-anchor carrier 930 may be used in the NB-IoT system utilizing the FDD transmission mode.

In accordance with the illustrated embodiment of FIG. 9, the SSS, transmitted using the anchor carrier 910 on a respective frequency location (not shown), may indicate the frequency location of the non-anchor carrier 930 by selecting one from a plurality of pre-defined frequency location options, as discussed above with respect to FIGS. 3B, 3C, and 3D. As such, after the UE 104 (FIG. 1) receives the SSS that is transmitted on the anchor carrier 910, the UE 104 can know using which frequency location to receive the SIB1 that is transmitted on the non-anchor carrier 930.

Further, in such an embodiment of using the SSS to indicate the frequency location of the non-anchor carrier 930, the BS 102 may use the frequency location of the non-anchor carrier 930 to determine a sequence "d(n)" of the SSS. Accordingly, the UE 104 may use the sequence d(n) of the SSS to estimate the indicated frequency location of the non-anchor carrier 930. In particular, the UE may use the following equation of the sequence d(n) of the SSS to estimate the indicated frequency location of the non-anchor carrier 930.

$$d(n) = b_q(m)e^{-j2\pi\theta_f n}e^{-j\frac{\pi u n'(n'+1)}{131}}$$

$$n = 0, 1, \ldots, 131$$

$$n' = n \bmod 131$$

$$m = n \bmod 128$$

wherein $u = N_{ID}^{Ncell} \bmod 126 + 3$ $$q = \left\lfloor \frac{N_{ID}^{Ncell}}{126} \right\rfloor$$

$$\theta_f = \frac{33}{132}i$$

Further, $N_{ID}^{Ncell}$ represents a physical cell identity (e.g., a value between 0~503); $b_q(m)$ represents a pre-defined sequence, where q can be 1, 2, or 3; i represents an index of the plurality of pre-defined frequency location options (e.g., 0, 1, 2, 3 in the current example).

Further, in accordance with some embodiments, which sub-frame(s) being used to transmit the SIB1 are determined by a Physical Cell Identity (PCID) and how many times the SIB1 is going to be repeatedly transmitted within a scheduling period as indicated by the MIB. In an example where sub-frame #5 of the frame 830-1, sub-frame #5 of the frame 830-2, sub-frame #5 of the frame 830-3, and sub-frame #5 of the frame 830-4 can be used to transmit the SIB1 (as shown in FIG. 8), a scheduling period spans across 256 frames (i.e., 256 sub-frames in a scheduling period can be used to transmit the SIB1) and one transmission of the SIB1 in a scheduling period consumes 8 sub-frames, a maximum number of the times (to repeatedly transmit the SIB1) within such a period is 32. When the MIB indicates that the SIB1 will be repeatedly transmitted 32 times in a scheduling period, sub-frame #5 of the frame 830-1, sub-frame #5 of the frame 830-2, sub-frame #5 of the frame 830-3, and sub-frame #5 of the frame 830-4 are then determined as being used to transmit the SIB1; and when the MIB indicates that the SIB1 will be repeatedly transmitted 16 times, the sub-frames, determined as being used to transmit the SIB1, are sub-frame #5 of the frame 830-1 and sub-frame #5 of the frame 830-3 for an odd PCID or sub-frame #5 of the frame 830-2 and sub-frame #5 of the frame 830-4 for an even PCID.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:
   transmitting a primary synchronization signal and a secondary synchronization signal using an anchor carrier with a first frequency location; and
   transmitting a system information block using a non-anchor carrier with a second frequency location different from the first frequency location, wherein a master information block is also transmitted using the anchor carrier, and wherein the master information block indicates one from a plurality of options of the second frequency location of the non-anchor carrier,
   wherein the plurality of options of the second frequency location comprises a first carrier spacing from the first frequency location when operated in a standalone mode and a second carrier spacing from the first frequency location, different from the first carrier spacing when operated in a non-standalone mode.

2. The method of claim 1, further comprising:
   determining a sequence of the secondary synchronization signal based on at least one of the plurality of options, wherein the second frequency location of the non-anchor carrier is pre-defined and is different from the first frequency location.

3. The method of claim 1, wherein each of the plurality of options of the second frequency location of the non-anchor carrier defines the respective second frequency location as being spaced from the first frequency location of the anchor carrier by singular or plural carrier bandwidths of the anchor carrier.

4. The method of claim 1, wherein the secondary synchronization signal, transmitted using the anchor carrier, indicates one from the plurality of options of the second frequency location of the non-anchor carrier.

5. The method of claim 4, determining a sequence of the secondary synchronization signal based on the indicated second frequency location of the non-anchor carrier.

6. A method, comprising:
   receiving a primary synchronization signal and a secondary synchronization signal modulated on an anchor carrier with a first frequency location;
   receiving a system information block modulated on a non-anchor carrier with a second frequency location different from the first frequency location, wherein a master information block is also transmitted using the anchor carrier, and wherein the master information block indicates one from a plurality of options of the second frequency location of the non-anchor carrier,
   wherein the plurality of options of the second frequency location comprises a first carrier spacing from the first frequency location when operated in a standalone mode and a second carrier spacing from the first frequency location, different from the first carrier spacing when operated in a non-standalone mode.

7. The method of claim 6, further comprising:
   determining the second frequency location of the non-anchor carrier based on a sequence of the secondary synchronization signal, wherein the second frequency location of the non-anchor carrier is pre-defined and is different from the first frequency location.

8. The method of claim 6, wherein each of the plurality of options of the second frequency location of the non-anchor carrier defines the respective second frequency location as being spaced from the first frequency location of the anchor carrier by singular or plural carrier bandwidths of the anchor carrier.

9. The method of claim 6, wherein the secondary synchronization signal, transmitted using the anchor carrier, indicates one from the plurality of options of the second frequency location of the non-anchor carrier.

10. The method of claim 9, further comprising estimating the indicated second frequency location of the non-anchor carrier based on a sequence of the secondary synchronization signal.

11. A communication node, comprising:
    a transmitter configured to:
        transmit a primary synchronization signal and a secondary synchronization signal using an anchor carrier with a first frequency location; and
        transmit a system information block using a non-anchor carrier with a second frequency location different from the first frequency location, wherein a master information block is also transmitted using the anchor carrier, and wherein the master information block indicates one from a plurality of options of the second frequency location of the non-anchor carrier,
    wherein the plurality of options of the second frequency location comprises a first carrier spacing from the first frequency location when operated in a standalone mode and a second carrier spacing from the first frequency location, different from the first carrier spacing, when operated in a non-standalone mode.

12. The communication node of claim 11, further comprising:
    at least one processor, coupled to the transmitter, and configured to determine a sequence of the secondary synchronization signal based on at least one of the plurality of options, wherein the second frequency location of the non-anchor carrier is pre-defined and is different from the first frequency location.

13. The communication node of claim 12, wherein each of the plurality of options of the second frequency location of the non-anchor carrier defines the respective second frequency location as being spaced from the first frequency location of the anchor carrier by singular or plural carrier bandwidths of the anchor carrier.

14. The communication node of claim 12, wherein the secondary synchronization signal, transmitted using the anchor carrier, indicates one from the plurality of options of the second frequency location of the non-anchor carrier.

15. The communication node of claim 14, wherein the at least one processor is further configured to determine a sequence of the secondary synchronization signal based on the indicated second frequency location of the non-anchor carrier.

16. A communication device, comprising:
   a receiver configured to:
      receive a primary synchronization signal and a secondary synchronization signal modulated on an anchor carrier with a first frequency location; and
      receive a system information block modulated on a non-anchor carrier with a second frequency location different from the first frequency location, wherein a master information block is also transmitted using the anchor carrier, and wherein the master information block indicates one from a plurality of options of the second frequency location of the non-anchor carrier,
   wherein the plurality of options of the second frequency location comprises a first carrier spacing from the first frequency location when operated in a standalone mode and a second carrier spacing from the first frequency location, different from the first carrier spacing, when operated in a non-standalone mode.

17. The communication device of claim 16, further comprising:
   at least one processor, coupled to the receiver, and configured to determine the second frequency location of the non-anchor carrier based on a sequence of the secondary synchronization signal, wherein the second frequency location of the non-anchor carrier is predefined and is different from the first frequency location.

18. The communication device of claim 17, wherein each of the plurality of options of the second frequency location of the non-anchor carrier defines the respective second frequency location as being spaced from the first frequency location of the anchor carrier by singular or plural carrier bandwidths of the anchor carrier.

19. The communication device of claim 17, wherein the secondary synchronization signal, transmitted using the anchor carrier, indicates one from the plurality of options of the second frequency location of the non-anchor carrier.

20. The communication device of claim 19, wherein the at least one processor is further configured to estimate the indicated second frequency location of the non-anchor carrier based on a sequence of the secondary synchronization signal.

* * * * *